(12) United States Patent
Shi et al.

(10) Patent No.: US 10,550,309 B2
(45) Date of Patent: Feb. 4, 2020

(54) SYNERGISTIC SULFIDE SCAVENGING ADDITIVES FOR USE IN OILFIELD OPERATIONS

(71) Applicant: Halliburton Energy Services, Inc., Houston, TX (US)

(72) Inventors: Liu Shi, Houston, TX (US); Funian Zhao, Tomball, TX (US); Liangwei Qu, Spring, TX (US); Edward Corrin, Houston, TX (US)

(73) Assignee: Multi-Chem Group, LLC, Houston, TX (US)

( * ) Notice: Subject to any disclaimer, the term of this patent is extended or adjusted under 35 U.S.C. 154(b) by 246 days.

(21) Appl. No.: 15/527,788

(22) PCT Filed: Dec. 22, 2014

(86) PCT No.: PCT/US2014/071882
§ 371 (c)(1),
(2) Date: May 18, 2017

(87) PCT Pub. No.: WO2016/105341
PCT Pub. Date: Jun. 30, 2016

(65) Prior Publication Data
US 2018/0346794 A1  Dec. 6, 2018

(51) Int. Cl.
*C02F 1/66* (2006.01)
*C02F 1/68* (2006.01)
(Continued)

(52) U.S. Cl.
CPC ............. *C09K 8/54* (2013.01); *C02F 1/66* (2013.01); *C02F 1/683* (2013.01); *C09K 8/035* (2013.01);
(Continued)

(58) Field of Classification Search
CPC ...... C02F 1/683; C02F 1/66; C02F 2101/101; C09K 8/035; C09K 8/54; C09K 2208/20; E21B 43/00
See application file for complete search history.

(56) References Cited

U.S. PATENT DOCUMENTS 3,459,852 A  8/1969  Roehm
4,680,127 A  7/1987  Edmonson
(Continued)

FOREIGN PATENT DOCUMENTS

WO  97/29834 A1  8/1997
WO  2012/003267 A2  1/2012

OTHER PUBLICATIONS

International Preliminary Report on Patentability in related PCT application No. PCT/US2014/071882 dated Jul. 6, 2017, 7 pages.
(Continued)

*Primary Examiner* — Lucas A Stelling
(74) *Attorney, Agent, or Firm* — Tenley Krueger; Baker Botts L.L.P.

(57) ABSTRACT

Systems, compositions, and methods for synergistic additives for use in the scavenging of sulfur-containing compounds encountered in oilfield operations are provided. In one embodiment, the methods comprise injecting a sulfide scavenging additive that does not comprise a significant amount of an aldehyde into at least a portion of a subterranean formation where one or more sulfur-containing species are present; and injecting a synergistic additive comprising at least one base into at least the portion of the subterranean formation.

7 Claims, 2 Drawing Sheets

A                B                C        D

E                F

(51) Int. Cl.
*C09K 8/035* (2006.01)
*C09K 8/54* (2006.01)
*E21B 43/00* (2006.01)
*C02F 101/10* (2006.01)

(52) U.S. Cl.
CPC ........ *E21B 43/00* (2013.01); *C02F 2101/101* (2013.01); *C09K 2208/20* (2013.01)

(56) References Cited

U.S. PATENT DOCUMENTS

| | | | | |
|---|---|---|---|---|
| 7,264,786 | B2* | 9/2007 | Pakulski | C09K 8/532 423/228 |
| 8,357,306 | B2* | 1/2013 | Yang | C09K 8/532 208/189 |
| 2009/0095658 | A1 | 4/2009 | Yang et al. | |
| 2010/0105580 | A1* | 4/2010 | Becker | C08F 20/04 507/225 |
| 2011/0315921 | A1 | 12/2011 | Ramachandran et al. | |
| 2012/0152857 | A1* | 6/2012 | Yang | C09K 8/532 210/749 |
| 2013/0004393 | A1 | 1/2013 | Menendez et al. | |
| 2014/0209510 | A1 | 7/2014 | Harrington et al. | |
| 2015/0119301 | A1* | 4/2015 | McDaniel | C09K 8/805 507/224 |

OTHER PUBLICATIONS

First Examination report issued in related Australian application No. 2014414855, dated Aug. 21, 2017, 7 pages.
Second Examination report issued in related Australian application No. 2014414855, dated Jun. 18, 2018, 6 pages.
Jiashen, Z. et al., "Control of Corrosion by Inhibitors in Drilling Muds Containing High Concentration of H2S", Corrosion, vol. 49, No. 2 (1993), pp. 170-174.
International Search Report and Written Opinion issued in PCT Application No. PCT/US2014/071882 dated Sep. 18, 2015, 10 pages.

* cited by examiner

A

B

C

D

E

F

SYNERGISTIC SULFIDE SCAVENGING ADDITIVES FOR USE IN OILFIELD OPERATIONS

CROSS-REFERENCE TO RELATED APPLICATION

The present application is a U.S. National Stage Application of International Application No. PCT/US2014/ 071882 filed Dec. 22, 2014, which is incorporated herein by reference in its entirety for all purposes.

BACKGROUND

The present disclosure relates to compositions, systems, and methods for treating subterranean formations, and more specifically, compositions, systems, and methods for the removal of sulfur-containing species encountered in subterranean formations.

Fluids in sewage systems, fluids produced from wells, and make-up fluids frequently contain hydrogen sulfide. Hydrogen sulfide gas is toxic with a density heavier than air, and therefore removal or inactivation of this sulfide ion is necessary to prevent poisoning of personnel and contamination of the area. Moreover, hydrogen sulfide gas is highly corrosive to pipelines and equipment used in the operation of an oil well. Sulfides may also react with other components in the system, causing undesirable reactions and products. Thus, removing hydrogen sulfide from produced fluid and gas is necessary for safe production.

In drilling some subterranean foiniations, and often particularly those bearing oil or gas, hydrogen sulfide accumulations are frequently encountered. Drilling fluid, used to convey cuttings to the surface, also brings hydrogen sulfide to the surface. Such sulfide in the drilling fluid is problematic because it can corrode the steel in the drilling apparatus and may be liberated into the atmosphere as toxic sulfide gas at the well surface. Scavengers are necessary to react with sulfides and form products that are nonhazardous and noncorrosive.

There are several classes of sulfide scavengers available, including nitrogen-, aldehyde-, and acrylate-based scavengers, but many have serious limitations. For example, triazine-based hydrogen sulfide scavengers have been commonly used in the industry, but triazine can increase the pH values of produced water and cause scale problems. Nitrogen-free scavengers such as formaldehyde, glyoxal, and acrolein create added difficulties for transportation, storage, and operation due to their toxicity and corrosivity. In contrast, non-aldehyde scavengers are less volatile, easier to handle, and easier to store, but they suffer from reduced reaction rates under neutral conditions.

BRIEF DESCRIPTION OF THE DRAWINGS

These drawings illustrate certain aspects of some of the embodiments of the present disclosure, and should not be used to limit or define the claims.

Figure 1:
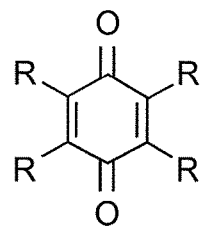
FIG. 1 is a diagram illustrating the chemical structure of sulfide scavenging additives according to certain embodiments of the present disclosure.
Figure 1:
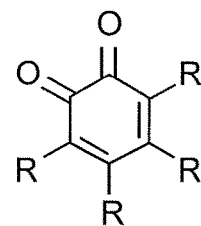
Figure 1:
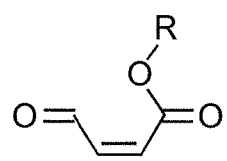
Figure 1:
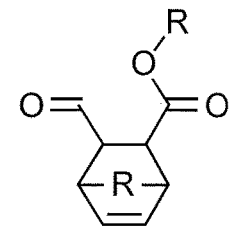
Figure 1:
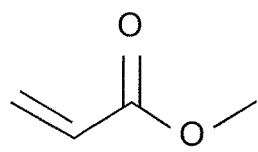
Figure 1:
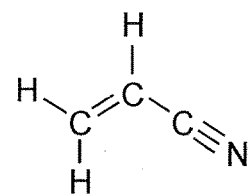

While embodiments of this disclosure have been depicted, such embodiments do not imply a limitation on the disclosure, and no such limitation should be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DESCRIPTION OF CERTAIN EMBODIMENTS

Illustrative embodiments of the present disclosure are described in detail herein. In the interest of clarity, not all features of an actual implementation may be described in this specification. It will of course be appreciated that in the development of any such actual embodiment, numerous implementation specific decisions may be made to achieve the specific implementation goals, which may vary from one implementation to another. Moreover, it will be appreciated that such a development effort might be complex and time consuming, but would nevertheless be a routine undertaking for those of ordinary skill in the art having the benefit of the present disclosure.

The present disclosure relates to systems and methods for the removal of sulfur-containing species. Particularly, the present disclosure relates to systems and methods for synergistic additives for use in the scavenging of sulfur-containing compounds encountered in oilfield operations.

More specifically, the present disclosure provides methods and systems for injecting a sulfide scavenging additive that does not comprise a significant amount of an aldehyde (referred to herein as a "non-aldehyde sulfide scavenging additive") into a location (e.g., at least a portion of a subterranean formation) where one or more sulfur-containing species are present therein, and injecting a synergistic additive comprising at least one base into that location. In certain embodiments, the synergistic additive comprises at least one amine. In some embodiments, the sulfide scavenging additive and the synergistic additive may be injected into a portion of a conduit or container wherein one or more sulfur-containing species are present.

Without limiting the disclosure to any particular theory or mechanism, it is believed that the synergistic additive may catalyze the reaction of the sulfide scavenging additive with one or more sulfide species with which it comes into contact, for example, according to a chemical reaction scheme known as the "conjugate addition." In certain embodiments, the synergistic additive may deprotonate the sulfide scavenging additives. In certain embodiments, the synergistic additive may raise the pH of the composition and a hydroxide ion deprotonates the sulfide scavenging additives. In turn, the sulfide scavenging additives may be more reactive and may more readily react with the sulfur-containing species. It is believed that this may increase the reaction rate of the sulfur-containing species and the sulfide scavenging additive.

Among the many potential advantages to the methods and compositions of the present disclosure, only some of which are alluded to herein, the methods, compositions, and systems of the present disclosure may allow for safer, less corrosive, less toxic, less reactive and/or more efficient removal of sulfur-containing species from a subterranean formation, conduit, or container. For example, in some cases non-aldehyde sulfide scavenging additives, while safe and easy to handle, may not have been practical for use in certain circumstances prior to the present disclosure, among other reasons, due to their slow reaction rate with sulfur-containing species. However, the injection of a synergistic additive may increase the reaction rate of the non-aldehyde sulfide scavenging additives, making them a more effective additive for the removal of sulfur-containing species while retaining the benefits to safety and operations. Another advantage may be the synergistic effect of a synergistic additive comprising at least one amine. In addition to catalyzing the non-aldehyde sulfide scavenging additive, the synergistic additive may also react with the sulfur-containing species, thereby increasing the total amount of sulfide removed from the subterranean formation, conduit, or container.

The sulfur-containing species of the present disclosure may be any compounds or chemical species that include one or more sulfur atoms or ions, including but not limited to hydrogen sulfide, mercaptans, polysulfides, or combinations thereof. A mercaptan may comprise any sulfur-containing compound of the general formula R—SH, such as ethyl mercaptan or ethanethiol. Polysulfides may comprise a class of sulfur species with alternating chains of sulfur atoms and hydrocarbons.

According to certain embodiments of the present disclosure, the non-aldehyde sulfide scavenging additive does not comprise a significant amount of an aldehyde or aldehyde functionality. In some embodiments, the sulfide scavenging additive reacts with the sulfur-containing species present in the subterranean formation, conduit, or container to remove the species. Examples of suitable non-aldehyde sulfide scavenging additives include, but are not limited to, acrylate-based compounds, acrylonitrile-based compounds, ethyl trans-4-oxo-2-butenoate, para-benzonquinone, ortho-benzoquinone, and any combinations thereof. For example, FIG. 1 shows generic derivatives of para-benzoquinone A, ortho-benzquionene B, and other suitable sulfide scavenging additives (C, D), wherein each R group may comprise any functional group, including but not limited to hydrogen atom, alkyl groups, alkene groups, alkyne groups (any of which may be substituted, unsubstituted, linear, and/or branched), and any combination or derivative thereof. As further examples, FIG. 1 shows acrylate E and acrylonitrile F.

As used herein, the term "acrylate" and "acrylate-based compound" includes all compounds containing the acrylate ion ($CH_2$=CHCOO—), their salts and esters, as well as all derivatives thereof that are formed by substituting one or more H atoms of the acrylate molecule with any R groups. Acrylate-based compounds that may be suitable for use as non-aldehyde sulfide scavenging additives in certain embodiments of the present disclosure include compounds having the general formula:

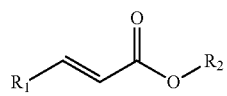

wherein $R_1$ may be any atom or functional group that can increase the activity of the adjacent double bond, such as a hydrogen atom, alkyl groups, alkene groups, alkyne groups (any of which may be substituted, unsubstituted, linear, and/or branched), and any combination or derivative thereof; and $R_2$ may be any hydrocarbon chain of any length and/or structure (including linear and/or branched chains and substituted or unsubstituted chains). In certain embodiments, the non-aldehyde sulfide scavenging additive of the present disclosure may include a combination of different compounds having this formula. In certain embodiments, larger, more complicated R groups may result in decreased reactivity of the sulfur scavenger. In addition, in certain embodiments the R groups may include functional groups having sulfur scavenging functionalities such as acrylonitrile.

As used herein, the term "acrylonitrile" and "acrylonitrile-based compound" includes 2-propenenitrile (IUPAC) having the molecular formula $C_3H_3N$, as well as all derivatives thereof that are formed by substituting one or more H atom of 2-propenenitrile molecule with any R groups. Acrylonitrile-based compounds that may be suitable for use as non-aldehyde sulfide scavenging additives in certain embodiments of the present disclosure include compounds having the general formula:

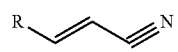

wherein R represents any atom or functional group that can increase the activity of the adjacent double bond, such as a hydrogen atom, alkyl groups, alkene groups, alkyne groups (any of which may be substituted, unsubstituted, linear, and/or branched), and any combination or derivative thereof. In certain embodiments, the non-aldehyde sulfide scavenging additive of the present disclosure may include a combination of different compounds having this formula. In certain embodiments, larger, more complicated R groups may result in decreased reactivity of the sulfur scavenger. In addition, in certain embodiments the R groups may include functional groups having sulfur scavenging functionalities such as acrylate.

In certain embodiments, the sulfide scavenging agent may be included in an amount of from about 0.1% up to about 100% by weight of the combination of the sulfide scavenging agent and the synergistic additive. In some embodiments, the sulfide scavenging agent may be included in an amount of from about 0.1% up to about 50% by weight of the combination of the sulfide scavenging agent and the synergistic additive.

The synergistic additive, according to some embodiments of the disclosure, may comprise any base known in the art. Without limiting the theory of the present disclosure to any particular mechanism, a base may catalyze the reaction of the scavenging additive, increasing the rate at which the sulfur-containing species are removed. Examples of suitable bases include, but are not limited to strong bases (e.g., sodium hydroxide, potassium hydroxide), weak bases (e.g., amines, ammonia, acetone) and any combinations thereof.

In some embodiments, the synergistic additive comprises at least one amine. The amine may increase the amount of sulfur-containing species removed by multiple mechanisms. In addition to catalyzing the scavenging additive, the amine may also react with the sulfur containing species. Thus, in some embodiments, the amine functions to increase the reaction rate and the amount of sulfur-containing species removed from the subterranean formation, conduit, or container. Examples of suitable amines include, but are not limited to primary amines, secondary amines, tertiary amines, quaternary amines, triazine, monomethylamine (MMA), monoethylamine, dimethylamine, dipropylamine, trimethylamine, triethylamine, tripropylamine, monomethanolamine, dimethanolamine, trimethanolamine, diethanolamine (DEA), triethanolamine (TEA), monoisopropanolamine, dipropanolamine, diisopropanolamine, tripropanolamine, N-methylethanolamine, dimethyl ethanol amine, methyl diethanolamine, dimethyl amino ethanol, diamines, and combinations thereof.

In some embodiments, the methods and compositions of the present disclosure may remove a larger amount of sulfur-containing species as compared to certain methods of sulfide scavenging using at least one amine alone or of injecting a non-aldehyde scavenger alone.

In certain embodiments of the present disclosure, sulfide scavenging additives, treatment fluids, or related additives of the present disclosure may be introduced into a subterranean formation, a well bore penetrating a subterranean formation, tubing (e.g., pipeline), and/or a container using any method or equipment known in the art. Introduction of the sulfide scavenging additives, treatment fluids, or related additives of the present disclosure may in such embodiments include delivery via any of a tube, umbilical, pump, gravity, and combinations thereof. Additives, treatment fluids, or related compounds of the present disclosure may, in various embodiments, be delivered downhole (e.g., into the well bore) or into top-side flowlines/pipelines or surface treating equipment.

For example, in certain embodiments, sulfide scavenging additives, treatment fluids, or related additives of the present disclosure may be applied to a subterranean formation and/or well bore using batch treatments, squeeze treatments, continuous treatments, and/or combinations thereof. In certain embodiments, a batch treatment may be performed in a subterranean formation by stopping production from the well and pumping a specific amount or quantity of sulfide scavenging additives, treatment fluids, or related additives into a well bore, which may be performed at one or more points in time during the life of a well. In other embodiments, a squeeze treatment may be performed by dissolving additives, treatment fluids, or related compounds in a suitable solvent at a suitable concentration and squeezing that solvent carrying the additives or related compounds downhole into the formation, allowing production out of the formation to bring the additives or related compounds to the desired location. In certain embodiments, the sulfur containing species are present in a gaseous phase and the synergistic and/or sulfide scavenging additives may be injected as a mist. In other embodiments, the sulfur containing species are present in a gaseous phase and the synergistic and/or sulfide scavenging additives may be injected as a liquid, such that the gaseous phase bubbles through the additives in a tower.

In some embodiments, the sulfide scavenging additive and the synergistic additive are not mixed until they are injected into the subterranean formation, conduit, or container. In certain embodiments, the sulfide scavenging additives and the synergistic additive are mixed shortly before they are injected. In other embodiments, a spacer is used to keep the sulfide scavenging additive and the synergistic additive from mixing until they reach a particular portion of a subterranean formation, conduit, or container. In some embodiments, the additives will remove less of the sulfur-containing species if they are mixed before they are injected.

In certain embodiments, an additive of the present disclosure may be added to a pipeline where one or more fluids enter the pipeline at one or more other locations along the length of the pipeline. In these embodiments, the additive may be added in batches or injected substantially continuously while the pipeline is being used.

The compositions used in the methods and systems of the present disclosure may comprise any carrier fluid known in the art, including aqueous fluids, non-aqueous fluids, and any combinations thereof. Aqueous fluids that may be suitable for use in the methods and systems of the present disclosure may comprise water from any source. Such aqueous fluids may comprise fresh water, salt water (e.g., water containing one or more salts dissolved therein), brine (e.g., saturated salt water), seawater, or any combination thereof. In most embodiments of the present disclosure, the aqueous fluids comprise one or more ionic species, such as those formed by salts dissolved in water. For example, seawater and/or produced water may comprise a variety of divalent cationic species dissolved therein. In certain embodiments, the density of the aqueous fluid can be adjusted, among other purposes, to provide additional particulate transport and suspension in the compositions of the present disclosure. In certain embodiments, the pH of the aqueous fluid may be adjusted (e.g., by a buffer or other pH adjusting agent) to a specific level, which may depend on, among other factors, the types of viscosifying agents, acids, and other additives included in the fluid. One of ordinary skill in the art, with the benefit of this disclosure, will recognize when such density and/or pH adjustments are appropriate. Examples of non-aqueous fluids that may be suitable for use in the methods and systems of the present disclosure include, but are not limited to oils, hydrocarbons, organic liquids, and the like. In certain embodiments, the fracturing fluids may comprise a mixture of one or more fluids and/or gases, including but not limited to emulsions, foams, and the like.

In certain embodiments, the compositions used in the methods and systems of the present disclosure optionally may comprise any number of additional additives. Examples of such additional additives include, but are not limited to, salts, surfactants, acids, proppant particulates, diverting agents, fluid loss control additives, gas, nitrogen, carbon dioxide, surface modifying agents, tackifying agents, foamers, corrosion inhibitors, scale inhibitors, catalysts, clay control agents, biocides, friction reducers, antifoam agents, bridging agents, flocculants, additional $H_2S$ scavengers, $CO_2$ scavengers, oxygen scavengers, lubricants, additional viscosifiers, breakers, weighting agents, relative permeability modifiers, resins, wetting agents, coating enhancement agents, filter cake removal agents, antifreeze agents (e.g., ethylene glycol), and the like. In certain embodiments, one or more of these additional additives (e.g., a crosslinking agent) may be added to the treatment fluid and/or activated after the viscosifying agent has been at least partially hydrated in the fluid. A person skilled in the art, with the benefit of this disclosure, will recognize the types of additives that may be included in the fluids of the present disclosure for a particular application.

In certain embodiments, surfactants may be used together with the sulfide scavenging additive and the synergistic additive. The surfactants may help disperse the additives in the fluid. Suitable surfactants include, but are not limited to alkoxylated alkyl alcohols and salts thereof and alkoxylated alkyl phenols and salts thereof, alkyl and aryl sulfonates, sulfates, phosphates, carboxylates, polyoxyalkyl glycols, fatty alcohols, polyoxyethylene glycol sorbitan alkyl esters, sorbitan alkyl esters, polysorbates, glucosides, quaternary amine compounds, amine oxide surfactants, and combinations thereof.

The sulfide scavenging additives and compositions of the present disclosure can be used in a variety of applications. These include downhole applications (e.g., drilling, fracturing, completions, oil production), use in conduits, containers, and/or other portions of refining applications, gas separation towers/applications, pipeline treatments, water disposal and/or treatments, and sewage disposal and/or treatments.

The present disclosure in some embodiments provides methods for using the additives, treatment fluids, and related compounds to carry out a variety of subterranean treatments, including but not limited to, hydraulic fracturing treatments, acidizing treatments, and drilling operations. In some embodiments, the compounds of the present disclosure may be used in treating a portion of a subterranean formation, for example, in acidizing treatments such as matrix acidizing or fracture acidizing. In certain embodiments, a treatment fluid may be introduced into a subterranean formation. In some embodiments, the treatment fluid may be introduced into a well bore that penetrates a subterranean formation. In some embodiments, the treatment fluid may be introduced at a pressure sufficient to create or enhance one or more fractures within the subterranean formation (e.g., hydraulic fracturing).

Treatment fluids can be used in a variety of subterranean treatment operations. As used herein, the terms "treat," "treatment," "treating," and grammatical equivalents thereof refer to any subterranean operation that uses a fluid in conjunction with achieving a desired function and/or for a desired purpose. Use of these terms does not imply any particular action by the treatment fluid. Illustrative treatment operations can include, for example, fracturing operations, gravel packing operations, acidizing operations, scale dissolution and removal, consolidation operations, and the like.

In certain embodiments, the sulfide scavenging additive and the synergistic additive are injected into at least a portion of a subterranean formation, conduit, or container wherein a sulfur-containing species is present. In certain embodiments, the sulfide scavenging additive reacts with the sulfur-containing species to form nonhazardous and/or non-corrosive products. The injection of the synergistic additive may in some embodiments increase the reaction rate of the sulfide scavenging additive with the sulfur-containing species. In other embodiments, the synergistic additive may also react with the sulfur-containing species to form non-hazardous and/or noncorrosive products.

In certain embodiments of the present disclosure, treatment fluids and/or additives of the present disclosure may be introduced into a subterranean formation, a well bore penetrating a subterranean formation, tubing (e.g., a pipeline), and/or container using any method or equipment known in the art. Introduction of the treatment fluids and/or additives of the present disclosure may in such embodiments include delivery via any of a tube, umbilical, pump, gravity, and combinations thereof. The treatment fluids and/or additives of the present disclosure may, in various embodiments, be delivered downhole (e.g., into the well bore) or into top-side flowlines/pipelines or surface treating equipment.

For example, in certain embodiments, treatment fluids and/or additives of the present disclosure may be applied to a subterranean formation and/or well bore using batch treatments, squeeze treatments, continuous treatments, and/or combinations thereof. In certain embodiments, a batch treatment may be performed in a subterranean formation by stopping production from the well and pumping a specific amount or quantity of a treatment fluids or additives into a well bore, which may be performed at one or more points in time during the life of a well. In other embodiments, a squeeze treatment may be performed by dissolving the non-aldehyde sulfide scavenging additive, the synergistic additive, treatment fluids, or related additives in a suitable solvent at a suitable concentration and squeezing that solvent carrying the additives downhole into the formation, allowing production out of the formation to bring the additives to the desired location.

In still other embodiments, treatment fluids and/or additives of the present disclosure may be injected into a portion of a subterranean formation using an annular space or capillary injection system to continuously introduce the treatment fluid(s) and/or additive(s) into the formation. Other means and/or equipment that may be used to continuously inject treatment fluids and/or additives of the present disclosure into a well bore include, but are not limited to slip-stream systems, annulus drip systems, cap strings, umbilical strings, gas lift systems, continuous metering systems, subsurface hydraulic systems, bypass feeders, and the like.

In certain embodiments, such continuous injection equipment at a well site may be controlled from a remote location and/or may be partially or completely automated. In certain embodiments, a treatment fluid comprising a sulfide-scavenging composition of the present disclosure may be circulated in the well bore using the same types of pumping systems and equipment at the surface that are used to introduce treatment fluids or additives into a well bore penetrating at least a portion of the subterranean formation. In certain embodiments, a sulfide-scavenging composition of the present disclosure could be dried and formed into a solid for delivery into rat holes, tanks, and/or a well bore.

Figure 2:
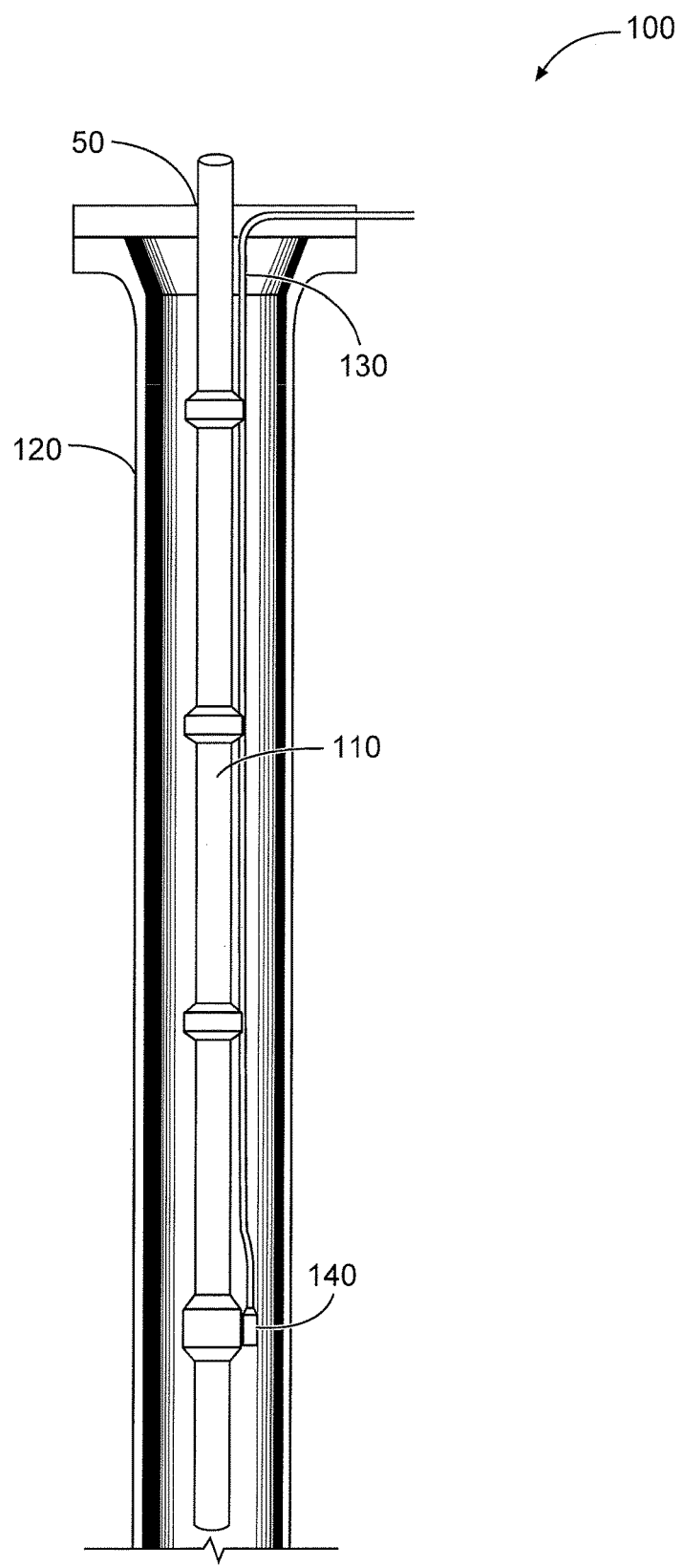
FIG. 2 is a diagram illustrating an injection system that may be used in accordance with certain embodiments of the present disclosure.

For example, additives or related compounds of the present disclosure may be introduced into a well bore using a capillary injection system as shown in FIG. 2. Referring now to FIG. 2, well bore 120 has been drilled to penetrate a portion of a subterranean formation 100. A tubing 110 (e.g., production tubing) has been placed in the well bore 120. A capillary injection tube 130 is disposed in the annular space between the outer surface of tubing 110 and the inner wall of well bore 120. The capillary injection tube 130 is connected to a side-pocket mandrel 140 at a lower section of the tubing 110. Treatment fluids and/or solutions comprising additives or related compounds may be injected into capillary injection tube 130 at the well 50 at the surface (e.g., using one or more pumps (not shown)) such that it mixes with production fluid at or near the side-pocket mandrel 140. The system shown in FIG. 2 also may include one or more valves (not shown) at one or more locations along the capillary injection tube 130, among other reasons, to prevent flowback of fluid or gas to the surface through the tube. Other capillary injection systems and side pocket mandrel devices (e.g., those used in gas lift production) may be used in a similar manner to the system shown in FIG. 2. In other embodiments, a dual injection mechanism or equipment may be used to inject the non-aldehyde sulfide scavenging additive and the synergistic additive separately at a well site. Such equipment may include a version of the system shown in FIG. 2 modified to provide multiple injection tubes and/or pumps, or any other suitable mechanism known in the art.

While not specifically illustrated herein, the disclosed methods and compositions may also directly or indirectly affect any transport or delivery equipment used to convey the additives to the subterranean formation 100, conduit, or container such as, for example, any transport vessels, conduits, pipelines, trucks, tubulars, and/or pipes used to fluidically move the additives from one location to another, any pumps, compressors, or motors used to drive the additives into motion, any valves or related joints used to regulate the pressure or flow rate of the additives, and any sensors (e.g., pressure and temperature), gauges, and/or combinations thereof, and the like.

To facilitate a better understanding of the present disclosure, the following examples of certain aspects of preferred embodiments are given. The following examples are not the only examples that could be given according to the present disclosure and are not intended to limit the scope of the disclosure or claims.

EXAMPLES

Example 1

In this example, 150 mL of water containing 300 ppm hydrogen sulfide was added to each of three sealed flasks and adjusted to 55° C. The hydrogen sulfide concentration was measured using a suitable commercially available test kit. One sample was used as a control test without further additives. The other two samples were treated by adding 13 mL of acrylonitrile solution (3%). A basic buffer solution was added to the third solution to adjust the pH=9. After the test, the control sample still contained 200 ppm $H_2S$. The results of the other two samples are shown in Tables 1 and 2.

TABLE 1

Results of acrylonitrile treatment without base catalyst at pH = ~7.5

| Time (h) | $H_2S$ Concentration (ppm) |
|---|---|
| 0 | 300 |
| 1 | 50 |
| 3 | <10 |

TABLE 2

Results of acrylonitrile treatment with base catalyst at pH = ~9

| Time (h) | $H_2S$ Concentration (ppm) |
|---|---|
| 0 | 300 |
| 1 | 20 |
| 2 | 0 |

Example 2

In this example, 200 mL of water containing 90 ppm hydrogen sulfide was added to each of two sealed flasks and adjusted to 55° C. The hydrogen sulfide concentration was measured using a suitable commercially available test kit. One sample was treated by adding 6 mL of methyl acrylate solution (3%), and the other was treated by adding a triazine synergist and 6 mL of methyl acrylate solution (3%). The results of the samples are shown in Table 3. The results show that the combination of methyl acrylate and triazine synergist increased the reaction rate more than methyl acrylate alone. The maximum $H_2S$ removal after one hour was also higher for the combination of methyl acrylate and triazine synergist.

TABLE 3

| Scavenger | Time (min) | $H_2S$ Concentration (ppm) | % $H_2S$ Scavenged |
|---|---|---|---|
| Methyl Acrylate | 0 | 90 | — |
|  | 20 | 50 | 44.4% |
|  | 40 | 27 | 70.0% |
|  | 60 | 24 | 73.3% |
| Methyl Acrylate and Triazine Synergist | 0 | 90 | — |
|  | 20 | 25 | 72.2% |
|  | 40 | 17 | 81.1% |
|  | 60 | 15 | 83.3% |

An embodiment of the present disclosure is a method comprising: injecting a sulfide scavenging additive that does not comprise a significant amount of an aldehyde into at least a portion of a subterranean formation where one or more sulfur-containing species are present therein; and injecting a synergistic additive comprising at least one weak base into at least the portion of the subterranean formation.

Another embodiment of the present disclosure is a method comprising: injecting a sulfide scavenging additive that does not comprise a significant amount of an aldehyde into at least a portion of a conduit or container where one or more sulfur-containing species are present therein; and injecting a synergistic additive comprising at least one weak base into at least the portion of the conduit or container.

Another embodiment of the present disclosure is a method comprising: injecting a sulfide scavenging additive into at least a portion of a subterranean formation where one or more sulfur-containing species are present therein, wherein the sulfide scavenging additive comprises at least one compound selected from the group consisting of an acrylate-based compound, an acrylonitrile-based compound, and any combination thereof; and injecting a synergistic additive comprising at least one base into at least the portion of the subterranean formation.

Another embodiment of the present disclosure is a method comprising: injecting a sulfide scavenging additive into at least a portion of a conduit or container where one or more sulfur-containing species are present therein, wherein the sulfide scavenging additive comprises at least one compound selected from the group consisting of an acrylate-based compound, an acrylonitrile-based compound, and any combination thereof; and injecting a synergistic additive comprising at least one base into at least the portion of the conduit or container. Optionally in this embodiment or any other embodiment disclosed herein, the synergistic additive may catalyze a reaction of the sulfide scavenging additive and the sulfur-containing species. Optionally in this embodiment or any other embodiment of the present disclosure, the synergistic additive may react with the sulfur-containing species. Optionally in this embodiment or any other embodiment of the present disclosure, the synergistic additive may increase a pH level of at least the portion of the conduit or container. Optionally in this embodiment or any other embodiment of the present disclosure, the at least one base may comprise at least one weak base. Optionally in this embodiment or any other embodiment of the present disclosure, the at least one base may comprise at least one amine. Optionally in this embodiment or any other embodiment of the present disclosure, the conduit or container may comprise at least a portion of a pipeline. Optionally in this embodiment or any other embodiment of the present disclosure, the conduit or container may comprise at least a portion of a refining system.

Another embodiment of the present disclosure is a method comprising: injecting a sulfide scavenging additive into at least a portion of a subterranean formation where one or more sulfur-containing species are present, wherein the sulfide scavenging additive comprises at least one compound selected from the group consisting of an acrylate-based compound, an acrylonitrile-based compound, and any combination thereof; and injecting a synergistic additive comprising at least one base into at least the portion of the subterranean formation. Optionally in this embodiment or any other embodiment of the present disclosure, the at least one base comprises at least one weak base. Optionally in this embodiment or any other embodiment of the present disclosure, the at least one base comprises at least one amine. Optionally in this embodiment or any other embodiment of the present disclosure, the sulfide scavenging additive comprises at least one compound selected from the group consisting of: an acrylate, an acrylonitrile, an ethyl trans-4- oxo-2-butenoate, a para-benzonquinone, an ortho-benzoquinone, and any combinations thereof. Optionally in this embodiment or any other embodiment of the present disclosure, the synergistic additive catalyzes a reaction of the sulfide scavenging additive and the sulfur-containing species. Optionally in this embodiment or any other embodiment of the present disclosure, the synergistic additive may increase a pH level of at least the portion of the subterranean formation.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. While numerous changes may be made by those skilled in the art, such changes are encompassed within the spirit of the subject matter defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. In particular, every range of values (e.g., "from about a to about b," or, equivalently, "from approximately a to b," or, equivalently, "from approximately a-b") disclosed herein is to be understood as referring to the power set (the set of all subsets) of the respective range of values. The terms in the claims have their plain, ordinary meaning unless otherwise explicitly and clearly defined by the patentee.

What is claimed is:

1. A method comprising:
    injecting a sulfide scavenging additive that is substantially free of aldehyde, the additive comprising at least one compound selected from the group consisting of an acrylate-based compound, an acrylonitrile-based compound and any combination thereof into at least a portion of a conduit or container where one or more sulfur-containing species are present; and
    injecting a synergistic additive comprising at least one weak base into the at least the portion of the conduit or container;
    wherein at least one of the sulfide scavenger additive or the synergistic additive is injected as a liquid or a mist.

2. The method of claim 1 wherein the at least one weak base comprises at least one amine.

3. The method of claim 1 wherein the synergistic additive catalyzes a reaction of the sulfide scavenging additive and the sulfur-containing species.

4. The method of claim 1 wherein the synergistic additive reacts with the sulfur-containing species.

5. The method of claim 1 wherein the synergistic additive increases a pH level of at least the portion of the conduit or container.

6. The method of claim 1 wherein the conduit or container comprises at least a portion of a pipeline.

7. The method of claim 1 wherein the conduit or container comprises at least a portion of a refining system.

* * * * *